(12) United States Patent
Nakaoka

(10) Patent No.: US 10,104,308 B2
(45) Date of Patent: Oct. 16, 2018

(54) IMAGE CAPTURING APPARATUS, METHOD FOR CONTROLLING THE SAME, AND STORAGE MEDIUM

(71) Applicant: CANON KABUSHIKI KAISHA, Tokyo (JP)

(72) Inventor: Hiroshi Nakaoka, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/798,114

(22) Filed: Jul. 13, 2015

(65) Prior Publication Data

US 2016/0037047 A1    Feb. 4, 2016

(30) Foreign Application Priority Data

Jul. 31, 2014  (JP) ................................ 2014-157048

(51) Int. Cl.
*H04N 9/73* (2006.01)
*H04N 5/235* (2006.01)

(52) U.S. Cl.
CPC ................................. *H04N 5/2357* (2013.01)

(58) Field of Classification Search
CPC ............................. H04N 5/235; H04N 5/2357
USPC .......................................... 348/223.1–229.1
See application file for complete search history.

(56) References Cited

U.S. PATENT DOCUMENTS

| | | | | |
|---|---|---|---|---|
| 2010/0013953 A1* | 1/2010 | Niikura | ................ | H04N 5/2357 348/226.1 |
| 2014/0011316 A1* | 1/2014 | Park | ........................ | H01L 31/18 438/70 |
| 2014/0267850 A1* | 9/2014 | Li | ...................... | H04N 5/23212 348/294 |
| 2014/0307117 A1* | 10/2014 | Feng | .................... | H04N 5/2351 348/218.1 |
| 2015/0312464 A1* | 10/2015 | Peng | .................... | H04N 5/2357 348/226.1 |

FOREIGN PATENT DOCUMENTS

| | | |
|---|---|---|
| JP | 2001-358994 A | 12/2001 |
| JP | 2004-222228 A | 8/2004 |
| JP | 2006-245784 A | 9/2006 |
| JP | 2010-098416 A | 4/2010 |

OTHER PUBLICATIONS

The above foreign patent documents were cited in the Apr. 13, 2018 Japanese Office Action, which is enclosed without an English Translation, that issued in Japanese Patent Application No. 2014157048.

* cited by examiner

*Primary Examiner* — Yogesh Aggarwal
(74) *Attorney, Agent, or Firm* — Cowan, Liebowitz & Latman, P.C.

(57) ABSTRACT

An image capturing apparatus comprises an image sensor, a driving unit configured to drive the image sensor, and a detection unit configured to detect a variation in amount of light within one frame image based on a plurality of image signals obtained by driving the image sensor with different accumulation periods by the driving unit.

24 Claims, 9 Drawing Sheets

IMAGE CAPTURING APPARATUS, METHOD FOR CONTROLLING THE SAME, AND STORAGE MEDIUM

BACKGROUND OF THE INVENTION

Field of the Invention

The present invention relates to an image capturing apparatus and a method for controlling the same.

Description of the Related Art

When capturing an image of a subject under a fluorescent light by using an image capturing apparatus utilizing an image sensor, cyclic light-and-dark patterns occur in the captured image in some cases. This phenomenon is referred to as fluorescent light flicker, which occurs depending on the relationship between the commercial power supply frequency and the vertical synchronization frequency of the image capturing apparatus. Japanese Patent Laid-Open No. 2004-222228 is an example of technology for detecting and correcting the cyclic variation in brightness in an image captured by using an image sensor, which is caused by a blinking light source.

However, the configuration disclosed in Japanese Patent Laid-Open No. 2004-222228 above has problems. For example, it has difficulty in eliminating the components of the subject and detecting the flicker with high accuracy. In the case of capturing continuous frames such as in moving image capturing, if the subject is not moving, it is possible to cancel the signal components of the subject by performing an inter-frame relational operation, and to extract only the flicker that is superimposed on image signals. However, when the subject is moving or the image capturing apparatus is moving, not only the components of the flicker, but also some components of the subject remain in the result of the inter-frame relational operation.

Also, there is a problem that, when the ratio between the period of image capturing (so-called frame rate) of the image capturing apparatus and the frequency of the flicker is 1:N (N is a natural number), the inter-frame relational operation results in cancellation of the flicker itself superimposed on the image signals, and making it impossible to detect the flicker.

SUMMARY OF THE INVENTION

The present invention is made in view of the above-described problems, and provides an image capturing apparatus that is capable of detecting a flicker in an image with high accuracy.

According to a first aspect of the present invention, there is provided an image capturing apparatus, comprising: an image sensor; a driving unit configured to drive the image sensor; and a detection unit configured to detect a variation in amount of light within one frame image based on a plurality of image signals obtained by driving the image sensor with different accumulation periods by the driving unit.

According to a second aspect of the present invention, there is provided a method for controlling an image capturing apparatus including an image sensor and a driving unit configured to drive the image sensor, the method comprising: a detecting step of detecting a variation in amount of light within one frame image, based on a plurality of image signals obtained by driving the image sensor with different accumulation periods by the driving unit.

Further features of the present invention will become apparent from the following description of exemplary embodiments with reference to the attached drawings.

DESCRIPTION OF THE EMBODIMENTS

The following provides a detailed description of embodiments of the present invention, with reference to the accompanying drawings.

First Embodiment

Figure 1:
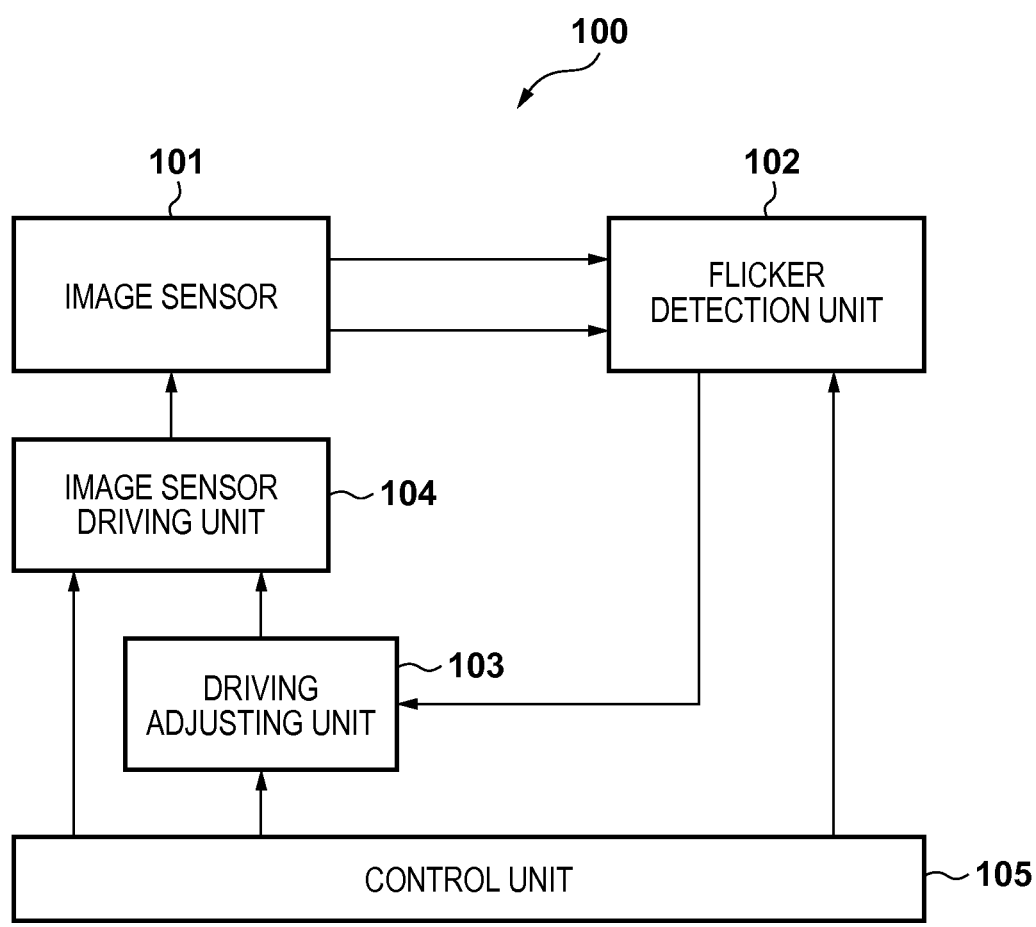
FIG. 1 is a block diagram showing a configuration of an image capturing apparatus according to a first embodiment of the present invention.

FIG. 1 is a block diagram showing a configuration of an image capturing apparatus 100 according to a first embodiment of the present invention. In FIG. 1, an image sensor 101 converts light, which has passed through an optical system for forming an image from a light reflected off a subject not shown in the drawings, into electrical signals, and outputs the signals as a plurality of image signals independently from each other. A flicker detection unit 102 detects a flicker superimposed within one frame image, which is a variation in irradiation intensity (irradiation light amount), based on the plurality of image signals obtained from the image sensor 101. A driving adjusting unit 103 transmits driving information (change information) for the image sensor 101 to an image sensor driving unit 104 described below, based on flicker information obtained from the flicker detection unit 102. The image sensor driving unit 104 transmits the driving information for the image sensor 101. A control unit 105 performs overall control of the image capturing apparatus 100.

Figure 2:
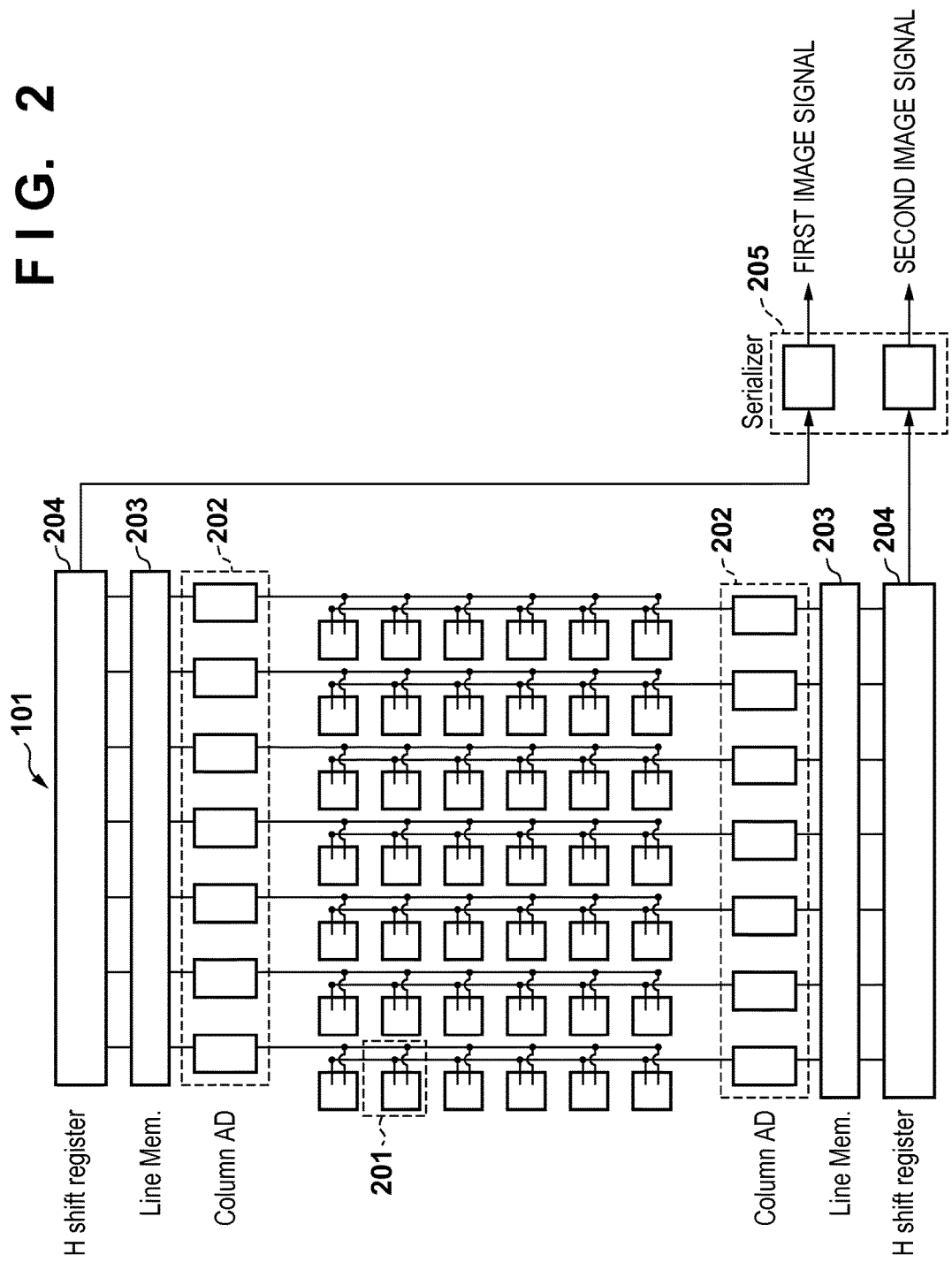
FIG. 2 is a block diagram showing a configuration of an image sensor according to the first embodiment.
Figure 3:
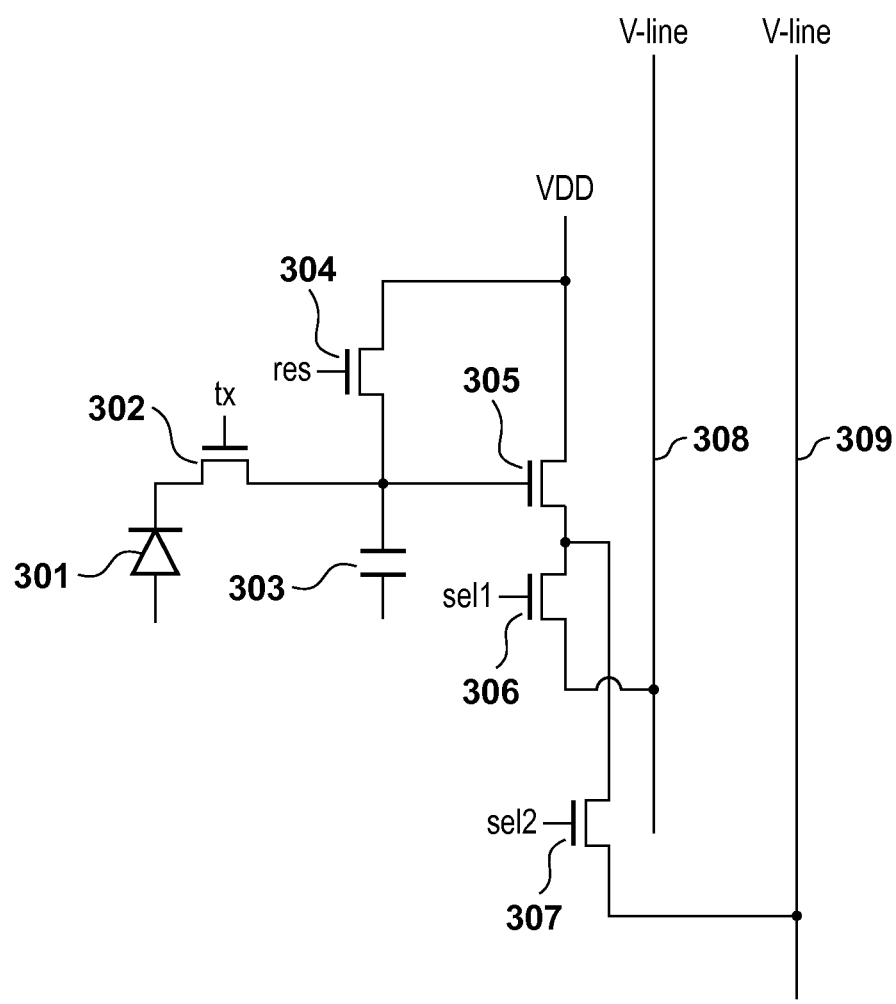
FIG. 3 is a schematic diagram showing a configuration of a pixel unit of the image sensor.

Next, a description is given of a configuration of the image sensor 101 according to the present embodiment, with reference to FIG. 2 and FIG. 3. The image sensor 101 in the present embodiment is, for example, a CMOS image sensor, which employs an XY address type scanning method. In FIG. 2, for the sake of simplification of the description, 6 rows and 7 columns of pixel units 201 are depicted. In reality, however, usually several hundreds of thousands to several tens of millions of pixel units 201 are arranged. In an actual image sensor, the pixel units 201 are two-dimensionally arranged according to a predetermined aspect ratio. Each pixel unit 201 may be covered with a color filter having the hue of one of R, G, and B colors. For example, R, G, and B color filters may be arranged in Bayer arrangement.

FIG. 3 is a diagram showing the details of the pixel unit 201. A photoelectric converter element 301, such as a photodiode, converts light from the subject into electric charge. A floating diffusion part (hereinafter, FD) 303 is a part serving as an accumulation region for temporarily accumulating the electric charge generated in the photoelectric converter element 301. A transfer switch 302 is controlled by a transfer pulse tx so as to turn on or off, and transfers the electric charge generated in the photoelectric converter element 301 to the FD 303. A reset switch 304 is controlled by a reset pulse res so as to turn on or off, and eliminates the electric charge accumulated in the FD 303. An amplification MOS amplifier 305 functions as a source follower. The gate electrode of the transfer switch 302 and the gate electrode of the reset switch 304 are respectively connected to a signal line for supplying the transfer pulse tx and a signal line for supplying the reset pulse res, each signal line supplying the pulse in the row direction and the column direction. The gate electrodes are selectively scanned by a scanning circuit not shown in the drawings. Selection switches 306 and 307 are respectively controlled by selection pulses sel1 and sel2 so as to turn on or off, and respectively connect the output from the amplification MOS amplifier 305 to the column output lines 308 and 309. The gate electrode of the selection switch 306 and the gate electrode of the selection switch 307 are respectively connected to a signal line for supplying the selection pulse sel1 and a signal line for supplying the selection pulse sel2, each signal line supplying the pulse in the row direction and the column direction. The gate electrodes are selectively scanned by the scanning circuit not shown in the drawings. The scanning circuit not shown in the drawings selectively controls the transfer switch 302, the reset switch 304, and the selection switches 306 and 307 according to the image sensor driving information from the image sensor driving unit 104, in response to reading out of the image signals from the plurality of pixel units 201.

The following provides a continuation of the description of the image sensor 101, with reference to FIG. 2 again. A column AD converter unit 202 converts signals read out in the column direction from the pixel units 201 into digital signals. The column AD converter unit 202 has, for each column, a voltage comparison device (comparator) and a counter. The column AD converter unit 202 is configured as a so-called single-slope converter. That is, signals from pixels, which are analogue signals, are input to one end of the comparator, and a ramp waveform is applied to the other end. Conversion to digital data is realized according to the value of the counter at the time of inversion of the comparator of each column. Note that the AD conversion method is not limited to the above method, and a column AD converter unit employing another AD conversion method may be used.

A line memory unit 203 temporarily stores digital data output from the column AD converter unit 202. A row direction transfer unit 204 is a part for sequentially reading pieces of digital data stored in the line memory unit 203, and controls the addresses in the line memory unit 203 and selects and outputs pieces of digital data. A serializer 205 converts digital signal output from the row direction transfer unit 204 to be in a predetermined format. The predetermined format is, for example, a differential transfer format such as LVDS, which is commonly known as a standard, and its purpose is to reduce the power consumption of the image capturing apparatus by transferring the digital signal in the form of small-amplitude voltage.

Note that the present embodiment is not intended to limit to the format conversion by the serializer 205 to any specific format. In particular, it is desirable that a serializer (having the same purpose and advantageous effects) is selected and utilized from among various kinds of serializers anticipated to be developed in the future. The digital signals that have undergone the format conversion by the serializer 205 are output as a first image signal and a second image signal, each corresponding to an incoming image signal from either one of the two row direction transfer units 204 depicted in the drawing. In the following description of the present embodiment, the first image signal is assumed as an image signal for recording and displaying, and the second image signal other than the first image signal is assumed as an image signal for detection and correction of a flicker.

Figure 5:
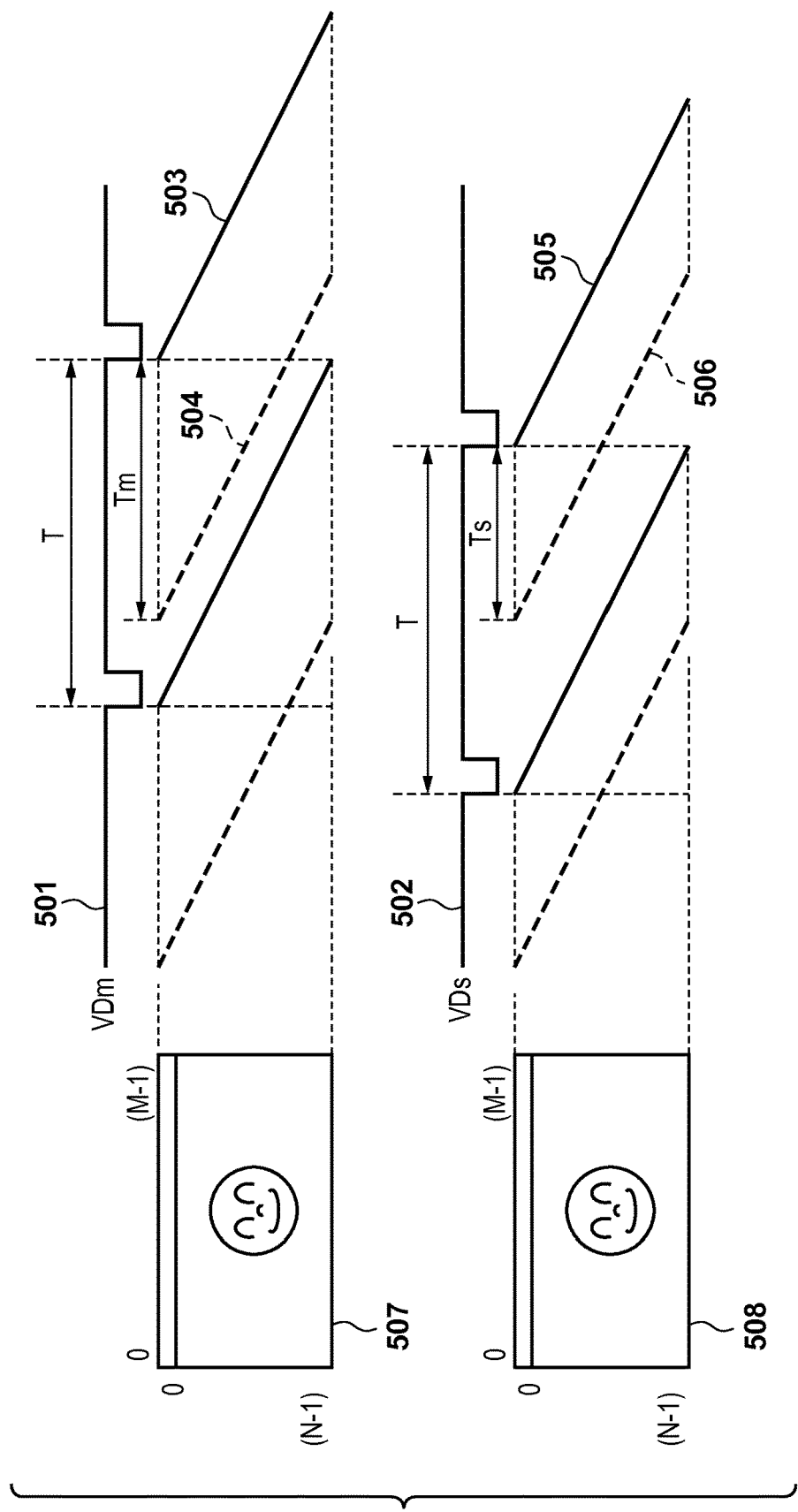
FIG. 5 is a timing chart showing how accumulation is performed by the image sensor.

FIG. 5 is a timing chart showing how the electric charge corresponding to the first image signal 507 and the second image signal 508, which are read out from the pixel units 201 constituting the image sensor 101, is accumulated in the image sensor 101. To facilitate the understanding of the description, the drawing is depicted on the assumption that all image signals from the pixel units 201 arranged in the image sensor 101 are read out, and that M pixels are arranged in the row direction (horizontal direction) and N pixels are arranged in the column direction (vertical direction). A vertical synchronizing signal 501 for obtaining the first image signal and the vertical synchronizing signal 502 for obtaining the second image signal are determined according to the image capturing method adopted in the image capturing apparatus, and each synchronizing signal is repeated with a period T. The vertical synchronizing signal 501 and the vertical synchronizing signal 502 are controlled by the control unit 105, and they determine the timing of driving the image sensor 101. Note that the horizontal axis of this timing chart is the time axis.

As indicated by timing 503 and timing 505, which are respectively the timing of reading out the first image signal and the timing of reading out the second image signal from the image sensor 101 according to the period of the vertical synchronizing signal 501, the first image signal and the second image signal in the present embodiment are read out by a progressive scanning method, which is a feature of CMOS sensors. Also, as shown in FIG. 5, a mechanism is employed for repeatedly reading out the first image signal and the second image signal at the timings corresponding to the period T of the vertical synchronizing signal.

For each line, control is performed such that the section between a timing 504 of resetting the electric charge corresponding to the first image signal and the timing 503 of reading out the first image signal has a time length that coincides with the length of an accumulation period Tm during which light is received. Also, for each line, control is performed such that the section between a timing 506 of resetting the electric charge corresponding to the second image signal and the timing 505 of reading out the second image signal has a time length that coincides with the length of an accumulation period Is during which light is received.

Since the first image signal is captured during the accumulation period Tm for recording and displaying, even when a blinking light source that causes a flicker exists in the environment for capturing, the flicker is not necessarily superimposed on the image signal. For example, when the frequency of the blinking light source is 100 Hz and the length of the accumulation period Tm is set to N/100 seconds (N denotes a natural number), the amount of reception light is the same in each line with respect to the first image signal, and accordingly the influence of the blinking light source does not appear in the image signals. This phenomenon has been known as a simple method for eliminating the influence of a blinking light source.

Figure 4:
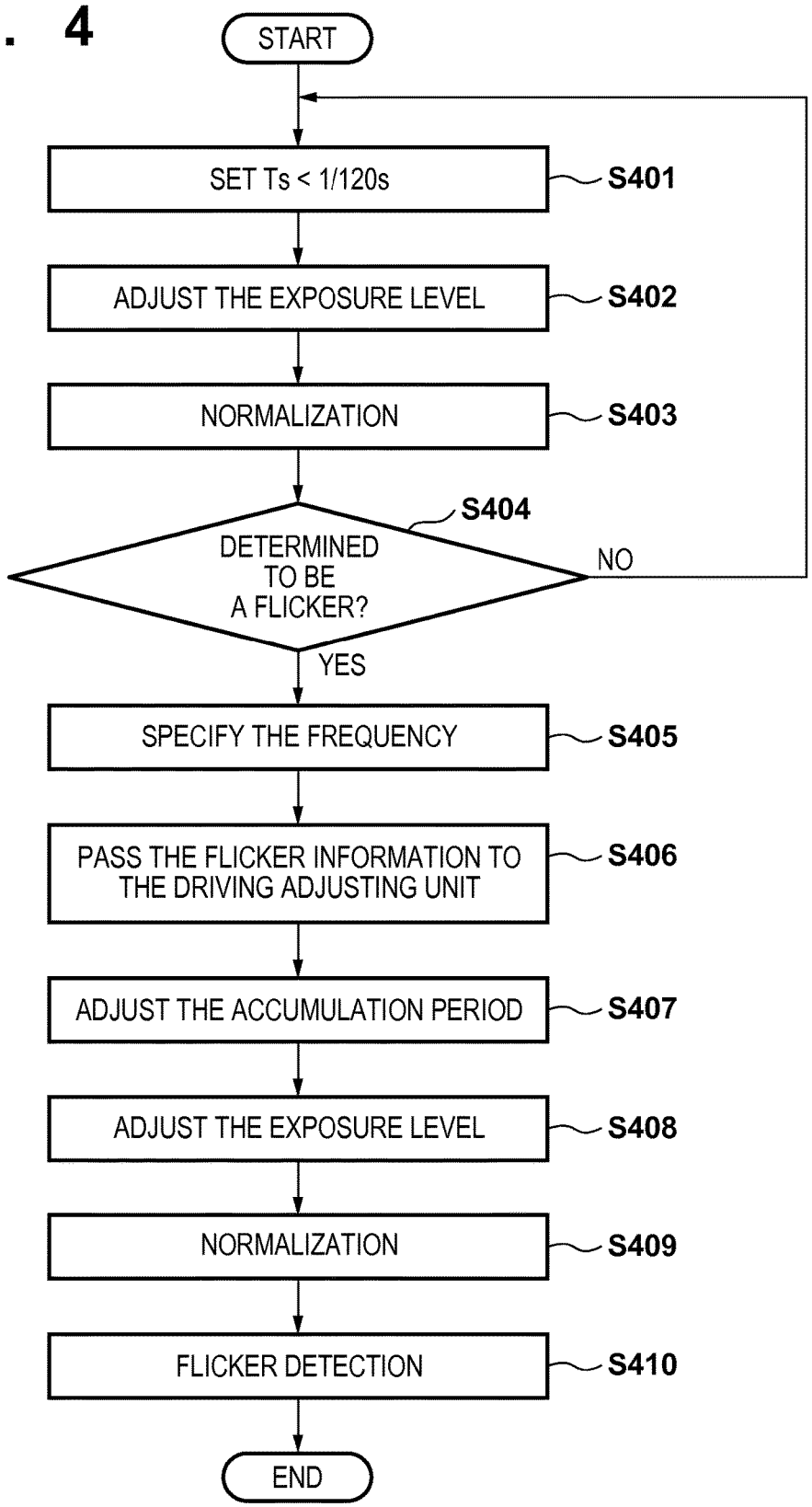
FIG. 4 is a flowchart showing an operation of the image capturing apparatus according to the first embodiment.

Next, with reference to FIG. 4, a description is given of a processing flow according to the present embodiment, particularly of a method for detecting a flicker. Step S401 to Step S404 constitute a loop for determining whether or not a flicker is superimposed on the image signals. At Step S401, in order to determine from the image signals the presence or absence of a blinking light source, which can be a cause of a flicker, the length of the accumulation period Ts for the second image signal is set to have a time length that causes a flicker. Usually, the frequency of blinking of a fluorescent light without an inverter is double the frequency of commercial AC power supplies, the length of the accumulation period Ts for the second image signal is set to be smaller than 1/120 seconds. Also, the length of the accumulation period Ts for the second image signal is set to be not the same as the length of the accumulation period Tm for the first image signal. In the case of a blinking light source using a pulse width modulation (PWM), such as an LED light, its period of blinking may be unknown in advance. However, by setting the difference between the length of the accumulation period Tm for the first image signal and the length of the accumulation period Is for the second image signal to be small, detection of a frequency that is equal to the reciprocal of the difference will be possible.

At Step S402, the exposure level is adjusted for the first image signal and the second image signal. The exposure level is determined by the f-number, the length of the accumulation period, and the gain of the optical system constituting the image capturing apparatus, and the gain is used for adjustment of the exposure after obtaining the image signals. The level adjustment of the second image signal is performed by using Gs calculated by the following Formula 1, where Fm and Gm respectively denote the f-number and gain of the first image signal, and Fs and Gs respectively denote the f-number and gain of the second image signal:

$$Gs = Gm \cdot (Fs/Fm)^2 \cdot (Tm/Ts) \qquad \text{Formula 1}$$

The f-number is determined by the focal length and effective aperture of the optical system constituting the image capturing apparatus, and the square of the f-number is inversely proportional to the amount of reception light.

At Step S403, each of the first image signal and the second image signal is normalized by integration (summation) in the line direction (one direction). Since the image sensor 101 is a CMOS sensor employing progressive scanning, the light-and-dark patterns caused by a blinking light source usually occur uniformly in the horizontal direction. Considering this, the normalization is performed in order to detect a flicker after compressing the image signals in the horizontal direction. When the components of the subject are represented as $$f(t) \qquad \text{Formula 2}$$

and the variation in brightness caused by the blinking light source is modeled as $$(1 + A \sin(\omega t)) \qquad \text{Formula 3}$$

$$(1 + B \sin(\omega t + \varphi)) \qquad \text{Formula 4}$$

the first image signal and second image signal after the normalization can be represented by the following Formula 5 and Formula 6:

$$f(t) \cdot (1 + A \sin(\omega t)) \qquad \text{Formula 5}$$

$$f(t) \cdot (1 + B \sin(\omega t + \varphi)) \qquad \text{Formula 6}$$

Note that $\omega$ is the frequency f of the blinking light source multiplied by $2\pi$.

Although the first image signal and the second image signal are discrete signals resulting from sampling, they are represented as continuous-time signals with the time t as a variable, for the convenience of description. Here, it is assumed that A denotes the amplitude of the flicker on the first image signal accumulated during the accumulation period Tm, and B denotes the amplitude of the flicker on the second image signal accumulated during the accumulation period Ts. It is also assumed that $\varphi$ denotes the phase difference of the flickers on the image signals, caused by the difference in length between the accumulation period Tm and the accumulation period Ts.

At Step S404, whether or not a flicker is occurring is determined by performing the relational operation between the normalized signals. When it is determined that a flicker is occurring, the processing proceeds to Step S405, and when it is not determined that a flicker exists, the processing proceeds to Step S401 again. In the case of performing a division operation (division processing) as the relational operation, whether or not a flicker is occurring is determined by performing integration processing of the absolute value of the result obtained by subtracting 1 from the result of the division operation. The result J of this integration processing can be calculated by the following Formula 7:

$$J = \int_0^T \left| \frac{(1 + A\sin(\omega t))}{(1 + B\sin(\omega t + \phi))} - 1 \right| dt \qquad \text{Formula 7}$$

As shown in FIG. 5, the interval of integration is bounded between 0 and T, so that all lines can be read during the vertical synchronization period T. However, some method for driving the image sensor 101 can finish reading of the necessary lines before the completion of the vertical synchronization period T. In such cases, an interval within which all the lines can be read may be adopted instead of the integration interval T. Now, if no flicker is occurring on the first image signal or the second image signal, A=0 and B=0. Accordingly, in Formula 7, the term located between the absolute value symbols will be always 0 throughout the range of integration. However, if either A or B is not 0, the term between the symbols representing the absolute value in Formula 7 will have a value that is not 0.

Figure 6:
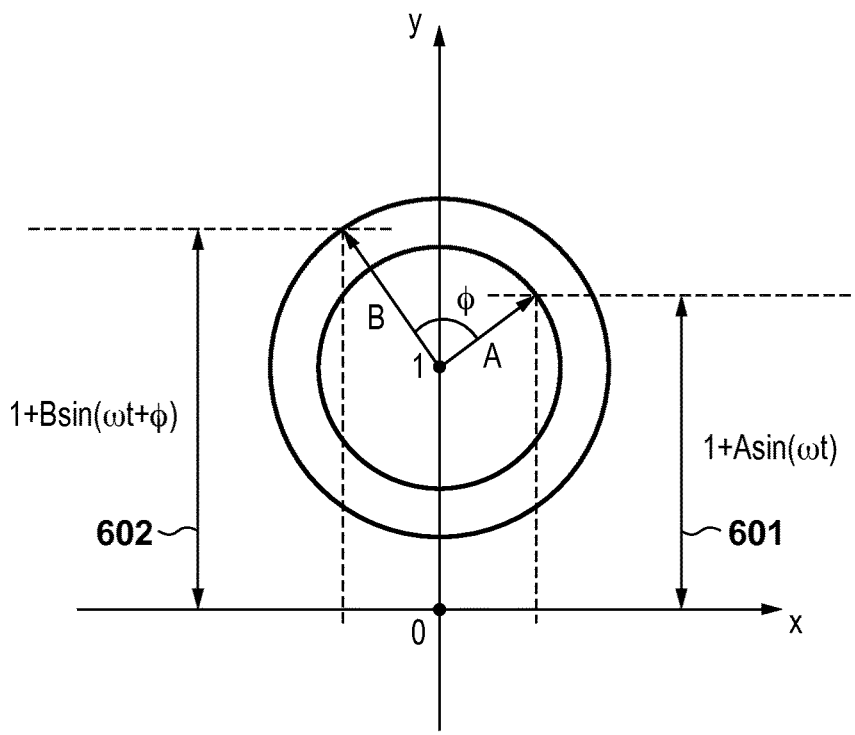
FIG. 6 is a diagram showing, in polar coordinates, the denominator and numerator of a formula for a relational operation.

FIG. 6 is a graphical representation in polar coordinates of Formula 3 and Formula 4 showing the variation in brightness caused by a blinking light source. 601 indicates the value of the variation in brightness of the flicker superimposed on the first image signal, and 602 indicates the value of the variation in brightness of the flicker superimposed on the second image signal. Since the arrows rotate about the coordinate point (0,1) at a predetermined angular velocity, when either A or B is not 0, the integral over the interval from 0 to T has a value, regardless of φ. The flicker detection unit 102 determines whether or not a flicker is occurring by performing a threshold determination as to the integration result J. According to Formula 7, the integration result J varies depending on the phase difference φ and the amplitudes A and B. Therefore, when the conditions leading to a small integral are satisfied, that is, when the phase difference φ is small and the difference between the amplitudes A and B is small, more specifically, when the difference in length between the accumulation period Tm for the first image signal and the accumulation period Ts for the second image signal and the difference in accumulation start time between Tm and Ts for the corresponding line are small, it is desirable that an adjustment of the threshold value is performed. Also, the accuracy in determining whether or not a flicker is occurring can be improved by observing the integration result J over a plurality of frames and determining that a flicker exists when determining that the integration result J stably takes a value that is not 0.

Next, in the case of performing a subtraction operation (subtraction processing) as the relational operation, whether or not a flicker is occurring is determined by performing integration processing of the absolute value of the result of the subtraction operation. The result J of this integration processing can be calculated by the following Formula 8:

$$J=\int_0^T |f(t)\cdot(1+A\sin(\omega t))-f(t)\cdot(1+B\sin(\omega t+\phi))|dt \qquad \text{Formula 8}$$

The formula above can be modified as follows:

$$J = \int_0^T |f(t)\cdot C\cdot \sin(\omega t + \varphi)| dt \qquad \text{Formula 9}$$

Where $$C = \sqrt{\{A^2 + B^2 - 2AB\cos(\varphi)\}} \qquad \text{Formula 10}$$

$$\varphi = \arctan\left(\frac{-B\sin(\phi)}{A - B\cos(\phi)}\right) + \alpha \qquad \text{Formula 11}$$

$$\begin{cases} \alpha = 0: A - B\cos(\phi) \geq 0 \\ \alpha = \pi: A - B\cos(\phi) < 0 \end{cases} \qquad \text{Formula 12}$$

As shown in FIG. 5, the interval of integration is bounded between 0 and T, so that all lines can be read during the vertical synchronization period T. However, some method for driving the image sensor 101 can finish reading of the necessary lines before the completion of the vertical synchronization period T. In such cases, an interval within which all the lines can be read may be adopted instead of the integration interval T. Now, if no flicker is occurring on the first image signal or the second image signal, A=0 and B=0. Accordingly, C in Formula 10 will be 0, and the result of operation by Formula 9 (the value of J) will be 0. However, if either A or B is not 0, the result of the operation by Formula 9 (the value of J) will have a value that is not 0. The flicker detection unit 102 determines whether or not a flicker is occurring by performing a threshold determination as to the integration result J. According to Formula 9, the integration result J varies depending on the phase difference φ and the amplitudes A and B. Therefore, when the conditions leading to a small integral are satisfied, that is, when the phase difference φ is small and the difference between the amplitudes A and B is small, more specifically, when the difference in length between the accumulation period Tm for the first image signal and the accumulation period Ts for the second image signal and the difference in accumulation start time between Tm and Ts for a corresponding line are small, it is desirable that an adjustment of the threshold value is performed. Also, the accuracy in detecting whether or not a flicker is occurring can be improved by observing the integration result J over a plurality of frames and determining that a flicker exists when determining that the integration result J stably takes a value that is not 0.

At Step S405, when it is determined at Step S404 that a flicker is occurring, the frequency of the flicker that is occurring is specified. The flicker frequency is specified by using the relational operation described for Step S404. When the division operation is performed as the relational operation, the flicker frequency is calculated for the time interval from when the result of the division becomes 1 to when it becomes 1 next time.

Figure 7:
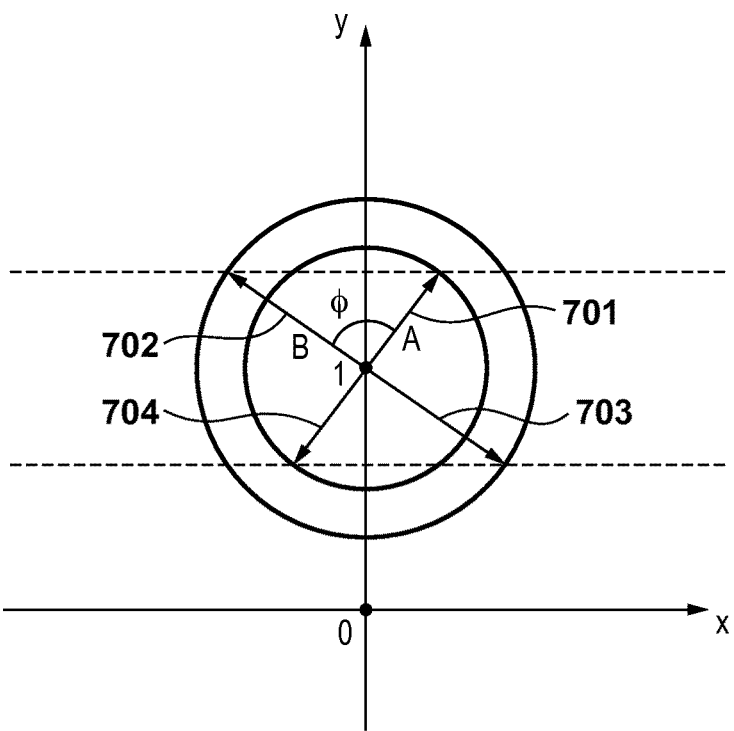
FIG. 7 is a diagram showing a condition under which the denominator and the numerator of the formula for the relational operation take a same value.

FIG. 7 shows changes in value of the denominator and the numerator of the fractional term of Formula 7. An arrow 701 represents a vector that rotates about the coordinate point (0,1) with amplitude A and angular velocity ω, and the y coordinate value at a given time point t indicates the value of the numerator in Formula 7. Similarly, an arrow 702 represents a vector that rotates about the coordinate point (0,1) with amplitude B and angular velocity ω, and the y coordinate value at a given time point t indicates the value of the denominator in Formula 7. The arrows 701 and 702 represent vectors that rotate at the same angular velocity ω, and they are continuously rotating about the coordinate point (0,1) while maintaining the phase difference φ between them. For this reason, when both the amplitudes A and B are not 0, the fractional term of Formula 7 becomes 1 twice during a rotation by 2π radian, regardless of the phase difference φ or the angular velocity ω. Also, as can be seen from FIG. 7, when the y coordinate values at the points indicated by the arrows 701 and 702 coincide, the y coordinate values coincide again at the points after a rotation by π radian (the points indicated by arrows 703 and 704 in FIG. 7). Therefore, by calculating the time length t from the first coincidence to the next coincidence, the frequency f of the flicker that is occurring can be calculated by the following formula:

$$f = \tfrac{1}{2} t \qquad \text{Formula 13}$$

Note that the above is an exemplary calculation of the frequency of the flicker that is occurring under the condition where the result of the division operation (the fractional term of Formula 7) is 1. However, the frequency calculation by Formula 13 is also possible by performing the operation located between the absolute value symbols in Formula 7, that is, by calculating the interval t between time points at which the result of the division operation subtracted by 1 becomes 0, or by calculating the time points t at which the result switches between positive and negative values.

Also, when the subtraction operation is performed as the relational operation, the frequency of the flicker that is occurring can be calculated by similarly using Formula 13 by calculating the time interval between the time points t at which $\sin(\omega t+\varphi)$ in Formula 9, included in the term between the absolute value symbols, becomes 0. Note, however, that when f(t) shown by Formula 2, which represents the components of the subject, is 0, the result of the subtraction is always 0 regardless of the angular frequency. Therefore, it is desirable to perform additional processing for excluding the case where f(t), which represents the components of the subject, is 0. Also note that in the case of digital signal processing, the data to be processed is obtained by sampling, and accordingly there is the possibility that the situation does not meet the above-described condition in both the case where the division operation is performed as the relational operation and the case where the subtraction operation is performed as the relational operation, depending on the sampling interval. In such cases, the time points t may be calculated by a conventional operation such as linear prediction according to the need. Note that the presence or absence of a flicker and the frequency of the flicker can be simultaneously determined by determining the frequency at which the flicker is occurring, by the method described for Step S405 instead of by the flicker determination method described for Step S404. Alternatively, the presence or absence of a flicker and the frequency of the flicker can be simultaneously determined by calculating the amplitude spectrum by the discrete-time Fourier transform operation and determining that the frequency f of the flicker is the frequency at which the amplitude is the maximum value in the obtained amplitude spectrum excluding the DC components.

At Step S406, flicker information is output to the driving adjusting unit 103. The flicker detection unit 102 transmits, as the flicker information, the flicker frequency detected at Step S405, to the driving adjusting unit 103. At Step S407, the driving adjusting unit 103 transmits, to the image sensor 101, adjusted driving information based on the flicker information obtained from the flicker detection unit 102, so that image capturing will be performed during the accumulation period Ts, during which no flicker occurs on the second image signal. The length of the accumulation period that is free of the occurrence of a flicker is obtained by multiplying the reciprocal of the flicker frequency by N (N is a natural number). At Step S408, the exposure level is adjusted for the first image signal and for the second image signal captured based on the adjusted driving information. The flicker detection unit 102 performs the exposure adjustment by calculating the difference in exposure according to Formula 1, taking into account the difference in length between the accumulation periods.

At Step S409, each of the first image signal and the second image signal is normalized by integration in the line direction. The method for normalization is the same as described for Step S403. At Step S410, a flicker occurring on the first image signal is detected from the first image signal and the second image signal after the normalization. A flicker occurring on the first image signal can be obtained by dividing the result of the normalization of the first image signal by the result of the normalization of the second image signal. This operation is a straightforward application of the model of the occurrence of a flicker. The result of the normalization of the first image signal is represented by Formula 5 as already described. Regarding the second image signal captured during the accumulation period that is free of the occurrence of a flicker, the amplitude B in Formula 6 can be regarded as 0. The result of the division is expressed by the following Formula 14:

$$D=1+A \sin(\omega t) \quad \text{Formula 14}$$

The maximum value of the result obtained by subtracting 1 from the division result D is the amplitude A. Alternatively, the amplitude A can be obtained in a similar manner by calculating the amplitude by performing a frequency analysis operation such as the Fourier transform. Note that when a discrete-time signal is used, the maximum value differs from the true value in some cases, depending on the sampling interval. For this reason, it is desirable to estimate the maximum value by a known method such as an interpolation operation, or to calculate the amplitude A based on the discrete-time Fourier transform operation with respect to known frequencies.

Note that Formula 14 is obtained from formulas defining only the relative phase difference between the first image signal and the second image signal. In reality, however, the phase difference between the timing of capturing by the image capturing apparatus and the period of blinking of the blinking light source is also involved as an initial phase. In this case, Formula 14 can be rewritten as follows:

$$D=1+A \sin(\omega t+\theta) \quad \text{Formula 15}$$

Even in this case, the amplitude A can be obtained in the same manner as described above. Also, the initial phase θ can be calculated from a known angular frequency ω and the time length t until the result of subtracting 1 from the division result D becomes 0. Furthermore, in the case of a discrete-time signal, both the amplitude and the initial phase can be obtained by the same discrete-time Fourier transform operation as described above.

The above-described processing produces the following advantageous effects. By using an image sensor that is capable of outputting a plurality of image signals in parallel and that is capable of controlling the electric charge accumulation period corresponding to each of the plurality of image signals, and by performing a relational operation between the plurality of image signals thus obtained, the above-described processing allows for flicker detection with reduced influence of the movement of the subject that is being captured or of the relative movement of the subject resulting from the movement of the image capturing apparatus itself. As a result, the time difference between a plurality of images is smaller than in the case of the conventional method for eliminating the components of the subject based on the difference between the frames, which has been problematic, and the components of the subject can be cancelled with higher accuracy.

Also, by determining the frequency of the flicker and feeding back the result to the image sensor, the second image signal, on which no flicker is occurring, can be obtained separately from the first image signal, on which a flicker is occurring, with almost no difference in the components of the subject, as described above. Thus, the accuracy of the detection of a flicker by the relational operation between both images is improved.

Furthermore, in the case of a known method of calculating the difference between frames, when the ratio between the frame rate of the image capturing apparatus and the frequency of the flicker is 1:N, there is a problem that the inter-frame relational operation results in cancellation of the flicker itself superimposed on the image signals, and making it impossible to detect the flicker. However, the present embodiment makes it possible to obtain a plurality of image signals with a reduced difference in the components of the subject. Therefore, a flicker can be detected even when the ratio between the frame rate and the frequency of the flicker is 1:N.

The present embodiment shows that the integration operation and the normalization operation of the first image signal and the second image signal at Step S403 and Step S409 are performed by the flicker detection unit 102. However, by providing the image sensor 101 with a means for performing integration and normalization, and, to the flicker detection unit 102, outputting the signal after the integration and the normalization as a flicker evaluation signal, the amount of the data of the signal transmitted from the image sensor 101 can be reduced. As a result, it becomes possible to effectively use a limited data transmission band.

Second Embodiment

Figure 8:
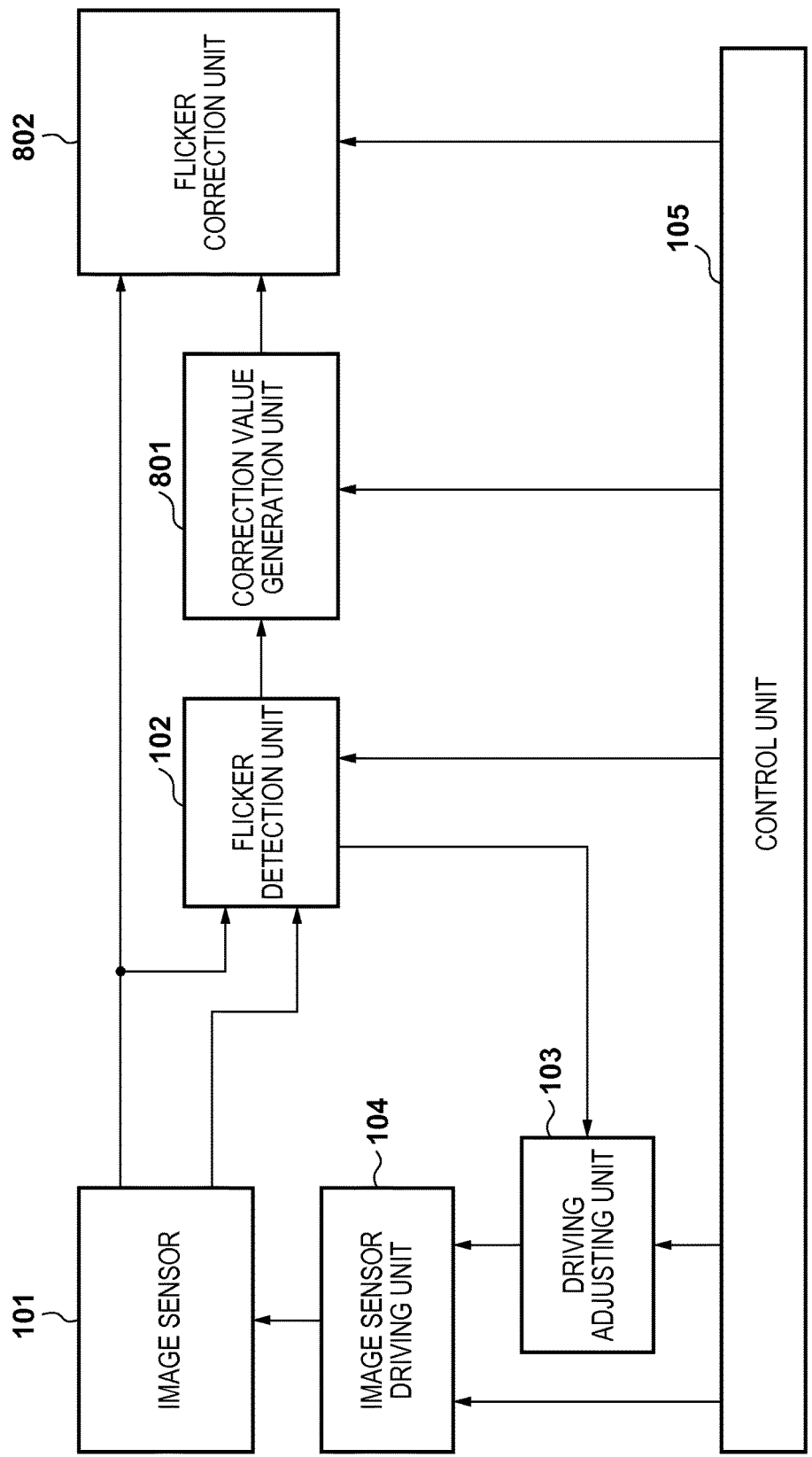
FIG. 8 is a block diagram showing a configuration of an image capturing apparatus according to a second embodiment of the present invention.

The second embodiment includes, in addition to the components of the first embodiment, a component for correcting the flicker that is superimposed on the first image signal, based on the detected flicker information. FIG. 8 shows a block diagram of an image capturing apparatus according to the second embodiment. The components given the same reference signs as in FIG. 1 are not described. A correction value generation unit 801 generates a flicker correction value for the first image signal based on flicker evaluation values obtained from the flicker detection unit 102, and transmits them to a flicker correction unit 802 described below. The flicker correction unit 802 applies the flicker correction value obtained by the correction value generation unit 801 to the first image signal.

Figure 9:
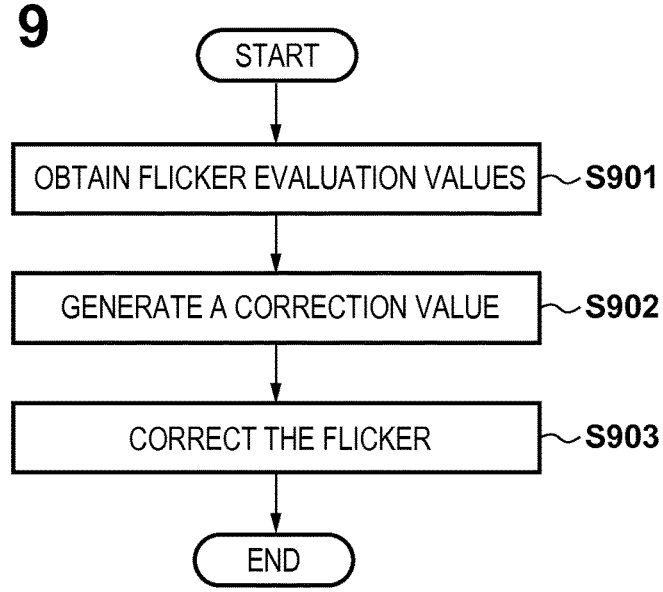
FIG. 9 is a flowchart showing an operation according to the second embodiment.

Next, with reference to FIG. 9, a description is given of the processing flow according to the present embodiment, particularly of a method for correcting a flicker superimposed on the first image signal.

At Step S901, flicker evaluation values are obtained from the flicker detection unit 102. The flicker detection unit 102 calculates the flicker evaluation values from the first image signal and the second image signal by performing a relational operation. As described for the first embodiment, the flicker evaluation values include at least the amplitude A, the initial phase $\theta$, and the frequency f (or $\omega$, $\omega$ being equal to f multiplied by $2\pi$) shown in Formula 15 with respect to the flicker superimposed on the first image signal.

At Step S902, the correction value generation unit 801 generates a correction value for correcting the flicker that is occurring, based on the flicker evaluation values. When Comp denotes a correction value for correcting the flicker, it can be calculated by the following Formula 16 according to the model of the flicker superimposed on the first image signal, using the amplitude A, the initial phase $\theta$, and the frequency f (or $\omega$, $\omega$ being equal to f multiplied by $2\pi$), which are the obtained flicker evaluation values.

$$\text{Comp}=1/\{1+A\sin(\omega t+\theta)\} \quad \text{Formula 16}$$

In the case of discrete-time signal processing, the sine value in the denominator of Formula 16 is stored in advance in a storage means, which is not shown in the drawings, in the form of a table, and the correction value Comp is generated by referring to the table according to $\omega$, t, and $\theta$. The variable t is usually an arithmetic sequence of the reciprocal of the sampling frequency, namely, the sampling time difference between adjacent lines of the first image signal or the second image signal. As seen from the comparison with Formula 15, the correction value can be also generated by obtaining the reciprocal of the result as it is of the relational operation described for Step S410 of the flowchart according to the first embodiment.

Furthermore, in the flicker detection unit 102, a partial flicker on the two-dimensional image space superimposed on the first image signal, which occurs due to a difference in irradiation light, can also be corrected by, not performing the normalization described for Step S409 of the flowchart according to the first embodiment, but performing the relational operation of Step S410 and using the reciprocal of the result of the operation as the correction value. At Step S903, the flicker superimposed on the first image signal is corrected by using the correction value generated by the correction value generation unit 801. The flicker correction unit 802 corrects the flicker by multiplying the input first image signal by the correction value, which is generated by the correction value generation unit 801.

By the above-described processing, the correction value for correcting the flicker superimposed on the first image signal can be generated in the flicker detection unit 102, based on the flicker evaluation values obtained by cancelling the components of the subject on the first image signal with high accuracy. By the correction by the flicker correction unit 802, the flicker can be corrected with higher accuracy.

Third Embodiment

Figure 10A:
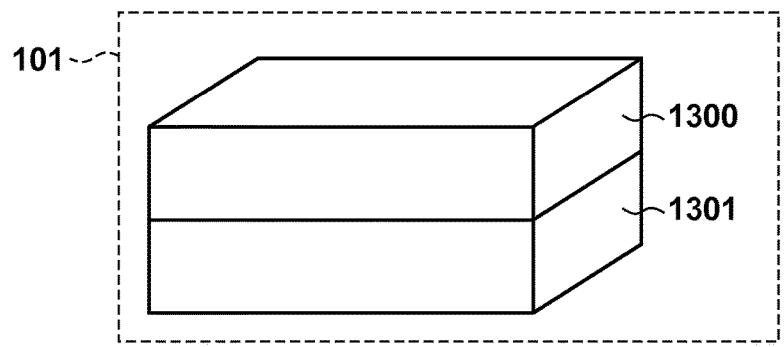
FIGS. 10A and 10B are diagrams showing examples of a stacked-type image sensor.
Figure 10B:
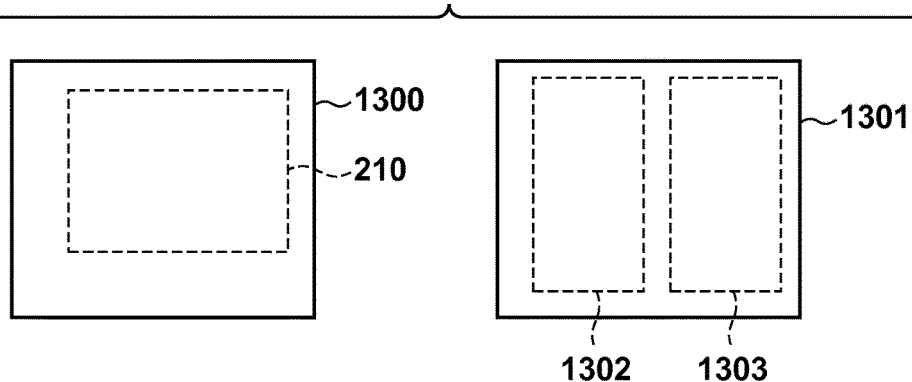

Next, a description is given of a third embodiment of the present invention. This embodiment shows an example where the image sensor 101 having the components according to the first embodiment and second embodiment described above is of a stacked-type. As shown in FIGS. 10A and 10B, the image sensor 101 according to the present embodiment is composed of an image sensor chip 1300 and a high-speed logic process chip 1301 which are chip-level stacked together. FIG. 10A is a perspective projection view, and FIG. 10B is a top view of each chip. The image sensor chip 1300 includes a region including a pixel region 210 provided with a large number of pixel units 201, and the high-speed logic process chip 1301 includes parts 1302 and 1303, such as a column AD circuit and a horizontal scanning circuit, by which high-speed processing involving digital data can be performed.

Fourth Embodiment

Figure 11:
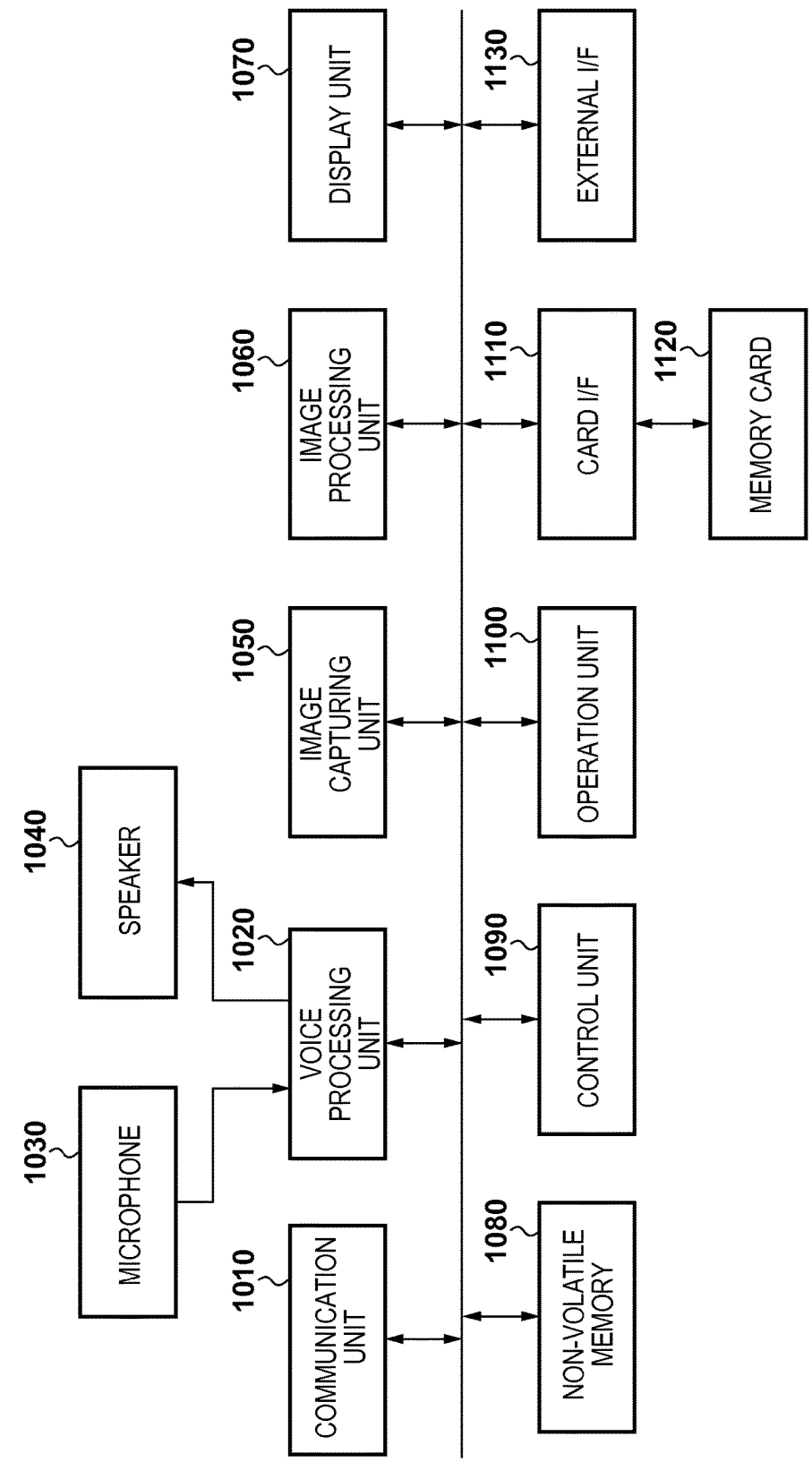
FIG. 11 is a block diagram showing a configuration of a mobile telephone according to a fourth embodiment of the present invention.

FIG. 11 is a block diagram showing a configuration of a mobile telephone 2000 as a fourth embodiment of the present invention. The mobile telephone 2000 according to the present embodiment has an e-mail function, an internet connection function, an image capturing function, a playback function and so on, in addition to a voice call function.

In FIG. 11, a communication unit 1010 exchanges voice data and image data with another telephone by a communication method according to the communication carrier that the user contracted with. A voice processing unit 1020, during a voice call, converts the voice data from a microphone 1030 to data in the format suitable for transmission, and transmits the data to the communication unit 1010. The voice processing unit 1020 also decodes the voice data from the communication party, which has been received from the communication unit 1010, and transmits the data to a speaker 1040. An image capturing unit 1050 includes an image sensor having a configuration according to any of the above-described first to third embodiments, and captures an image of the subject and outputs image data. An image processing unit 1060, during image capturing, processes the image data captured by the image capturing unit 1050, converts the image data to data in the format suitable for recording, and outputs the data. Also, during playback of the recorded image, the image processing unit 1060 processes the image that is played back, and transmits the image to a display unit 1070. The display unit 1070 includes a liquid crystal display panel that measures several inches, and displays various screens in response to instructions from a control unit 1090. A non-volatile memory 1080 stores data such as address book information, e-mail data, image data captured by the image capturing unit 1050, etc.

The control unit 1090 includes a CPU, a memory, etc., and controls each unit included in the mobile telephone 2000 according to a control program stored in a memory, which is not shown in the drawings. An operation unit 1100 includes various operation keys such as a power button, numeric keys, and other keys used by the user when inputting data. A card I/F 1110 records/plays back various kinds of data to/from a memory card 1120. An external I/F 1130 transmits data stored in the non-volatile memory 1080 or the memory card 1120 to an external device, and receives data transmitted by an external device. The external I/F 1130 performs communication according to a known communication method such as a wired communication method via USB or the like, or a wireless communication method.

Next, a description is given of the voice call function of the mobile telephone 2000. When making a telephone call to the communication party, the user inputs the number of the communication party by operating the numeric keys of the operation unit 1100, or displaying the address book stored in the non-volatile memory 1080 on the display unit 1070, selects the communication party, and makes an instruction to call. When an instruction to call is made, the control unit 1090 causes the communication unit 1010 to make a call to the communication party. When the call is received by the communication party, the communication unit 1010 outputs the voice data from the party to the voice processing unit 1020, while transmitting the voice data of the user to the party.

Also, when transmitting an e-mail, the user makes an instruction to create a mail by using the operation unit 1100. When an instruction to compose a mail is made, the control unit 1090 displays a screen for creating a mail, on the display unit 1070. The user inputs a destination address, the text, etc. by using the operation unit 1100, and makes an instruction to transmit the mail. When an instruction to transmit the mail is made, the control unit 1090 transmits the address information and the data of the mail text to the communication unit 1010. The communication unit 1010 converts the mail data to data in a suitable format for communication, and transmits the data to the destination. Also, when receiving an e-mail, the communication unit 1010 converts the received mail data to data in a suitable format for displaying, and displays the data on the display unit 1070.

Next, a description is given of the image capturing function of the mobile telephone 2000. When the user sets the image capturing mode by operating the operation unit 1100 and then makes an instruction to perform still or moving image capturing, the image capturing unit 1050 captures still image data or moving image data, and transmits the data to the image processing unit 1060. The image processing unit 1060 processes the still image data or the moving image data thus captured, and stores the processed data in the non-volatile memory 1080. Also, the image processing unit 1060 transmits the captured still image data or moving image data to the card I/F 1110. The card I/F 1110 stores the still image or moving image data into the memory card 1120.

The mobile telephone 2000 is also capable of transmitting a file including the still image or moving image data thus captured, in the form of an attached file of an e-mail. Specifically, when transmitting an e-mail, an image file stored in the non-volatile memory 1080 or the memory card 1120 is selected, and an instruction is made to transmit it as an attached file.

The mobile telephone 2000 is also capable of transmitting a file including still image or moving image data thus captured to an external device such as a PC or another telephone via the external I/F 1130. The user selects an image file stored in the non-volatile memory 1080 or the memory card 1120 by operating the operation unit 1100, and makes an instruction to transmit it. The control unit 1090 reads out the selected image file from the non-volatile memory 1080 or the memory card 1120, and controls the external I/F 1130 so that the image file will be transmitted to the external device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-157048, filed Jul. 31, 2014, which is hereby incorporated by reference herein in its entirety.

What is claimed is:

1. An image capturing apparatus, comprising:
   an image sensor which has a plurality of output portions and is capable of accumulating a plurality of image signals whose accumulation time periods are different in parallel;
   a driver which drives the image sensor to output the plurality of image signals whose accumulation time periods are different from each of the plurality of output portions in parallel, wherein the image signals whose accumulation time periods are different are obtained from pixels arranged within same pixel area of the image sensor; and
   a detector which detects presence or absence of a variation in amount of light within one frame image based on a value calculated by integrating an absolute value of a value obtained by subtracting 1 from a result of a division processing on the plurality of image signals whose accumulation time periods are different.

2. The image capturing apparatus according to claim 1, further comprising an adjuster that modifies an image capturing condition for the image sensor according to the variation in amount of light within one frame image detected by the detector.

3. The image capturing apparatus according to claim 2, wherein the image capturing condition includes an accumulation period of the image sensor.

4. The image capturing apparatus according to claim 1, wherein the variation in amount of light includes at least one of: a frequency of a variation in amount of light; an amplitude of a variation in amount of light; and a phase of a variation in amount of light.

5. The image capturing apparatus according to claim 1, wherein at least one image signal from among the plurality of image signals is output after undergoing, in the image sensor, normalization in one direction of the image signal.

6. The image capturing apparatus according to claim 5, wherein the normalization is integration in a line direction of the image signal.

7. The image capturing apparatus according to claim 1, further comprising:
a generator which generates a correction value for correcting at least one image signal from among the plurality of image signals, based on the variation in amount of light detected by the detector; and
a corrector which corrects the at least one image signal by applying the correction value to the at least one image signal.

8. The image capturing apparatus according to claim 1, wherein the image sensor is a stacked-type image sensor in which a plurality of semiconductor substrates are stacked.

9. The image capturing apparatus according to claim 1, further comprising a data communication unit which has a data communication function.

10. The image capturing apparatus according to claim 9, wherein the data communication function includes at least one of a voice call function, an internet connection function, and an e-mail function.

11. An image capturing apparatus comprising:
an image sensor which has a plurality of output portions and is capable of accumulating a plurality of image signals whose accumulation time periods are different in parallel;
a driver which drives the image sensor to output the plurality of image signals whose accumulation time periods are different from each of the plurality of output portions in parallel, wherein the image signals whose accumulation time periods are different are obtain d from pixels arranged within same pixel area of the image sensor; and
a detector which detects presence or absence of a variation in amount of light within one frame image based on a value calculated by integrating an absolute value of a result of the subtraction processing on the plurality of image signals whose accumulation time periods are different.

12. The image capturing apparatus according to claim 11, further comprising an adjuster that modifies an image capturing condition for the image sensor according to the variation in amount of light within one frame image detected by the detector.

13. The image capturing apparatus according to claim 12, wherein the image capturing condition includes an accumulation period of the image sensor.

14. The image capturing apparatus according to claim 11, wherein the variation in amount of light includes at least one of: a frequency of a variation in amount of light; an amplitude of a variation in amount of light; and a phase of a variation in amount of light.

15. The image capturing apparatus according to claim 11, wherein at least one image signal from among the plurality of image signals is output after undergoing, in the image sensor, normalization in one direction of the image signal.

16. The image capturing apparatus according to claim 15, wherein the normalization is integration in a line direction of the image signal.

17. The image capturing apparatus according to claim 11, further comprising:
a generator which generates a correction value for correcting at least one image signal from among the plurality of image signals, based on the variation in amount of light detected by the detector; and
a corrector which corrects the at least one image signal by applying the correction value to the at least one image signal.

18. The image capturing apparatus according to claim 11, wherein the image sensor is a stacked-type image sensor in which a plurality of semiconductor substrates are stacked.

19. The image capturing apparatus according to claim 11, further comprising a data communication unit which has a data communication function.

20. The image capturing apparatus according to claim 19, wherein the data communication function includes at least one of a voice call function, an internet connection function, and an e-mail function.

21. A method for controlling an image capturing apparatus including an image sensor which has a plurality of output portions and is capable of accumulating a plurality of image signals whose accumulation time periods are different in parallel, the method comprising:
driving the image sensor to output the plurality of image signals whose accumulation time periods are different from each of the plurality of output portions in parallel, wherein the image signals whose accumulation time periods are different are obtained from pixels arranged within same pixel area of the image sensor; and
detecting a presence or absence of variation in amount of light within one frame image based on a value calculated by integrating an absolute value of a value obtained by subtracting 1 from a result of the division processing on the plurality of image signals whose accumulation time periods are different.

22. A non-transitory computer-readable storage medium storing therein a program for causing a computer to perform a method for controlling an image capturing apparatus including an image sensor which has a plurality of output portions and is capable of accumulating a plurality of image signals whose accumulation time periods are different in parallel, the method comprising:
driving the image sensor to output the plurality of image signals whose accumulation time periods are different from each of the plurality of output portions in parallel, wherein the image signals whose accumulation time periods are different are obtained from pixels arranged within same pixel area of the image sensor; and
detecting presence or absence of a variation in amount of light within one frame image based on a value calculated by integrating an absolute value of a value obtained by subtracting 1 from a result of the division processing on the plurality of image signals whose accumulation time periods are different.

23. A method of controlling an image capturing apparatus including an image sensor which has a plurality of output portions and is capable of accumulating a plurality of image signals whose accumulation time periods are different in parallel, the method comprising:
driving the image sensor to output the plurality of image signals whose accumulation time periods are different from each of the plurality of output portions in parallel, wherein the image signals whose accumulation time periods are different are obtained from pixels arranged within same pixel area of the image sensor; and detecting presence or absence of a variation in amount of light within one frame image based on a value calculated by integrating an absolute value of a result of the subtraction processing on the plurality of image signals whose accumulation time periods are different.

24. A non-transitory computer-readable storage medium storing therein a program for causing a computer to perform a method for controlling an image capturing apparatus including an image sensor which has a plurality of output portions and is capable of accumulating a plurality of image signals whose accumulation time periods are different in parallel, the method comprising:

driving the image sensor to output the plurality of image signals whose accumulation time periods are different from each of the plurality of output portions in parallel, wherein the image signals whose accumulation time periods are different are obtained from pixels arranged within same pixel area of the image sensor, and detecting presence or absence of a variation in amount of light within one frame image based on a value calculated by integrating an absolute value of a result of the subtraction processing on the plurality of image signals whose accumulation time periods are different.

* * * * *